United States Patent
Klimmasch et al.

(10) Patent No.: US 11,286,331 B2
(45) Date of Patent: Mar. 29, 2022

(54) HYDROPHILICALLY MODIFIED POLYISOCYANURATE PLASTIC AND PROCESS FOR PRODUCTION THEREOF

(71) Applicant: Covestro Deutschland AG, Leverkusen (DE)

(72) Inventors: Thomas Klimmasch, Leverkusen (DE); Jan Weikard, Leverkusen (DE); Mathias Matner, Neuss (DE); Dirk Achten, Leverkusen (DE); Hans-Josef Laas, Odenthal (DE); Heiko Hocke, Shanghai (CN); Dieter Mager, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/095,119

(22) PCT Filed: Oct. 25, 2016

(86) PCT No.: PCT/EP2016/075679
§ 371 (c)(1),
(2) Date: Oct. 19, 2018

(87) PCT Pub. No.: WO2017/182108
PCT Pub. Date: Oct. 26, 2017

(65) Prior Publication Data
US 2019/0144596 A1     May 16, 2019

(30) Foreign Application Priority Data
Apr. 21, 2016 (EP) .................... 16166433

(51) Int. Cl.
| | | |
|---|---|---|
| *C08G 18/73* | (2006.01) | |
| *C08G 18/79* | (2006.01) | |
| *C08G 18/22* | (2006.01) | |
| *C08G 18/28* | (2006.01) | |
| *C08G 18/80* | (2006.01) | |
| *C08G 18/02* | (2006.01) | |
| *C08G 18/18* | (2006.01) | |
| *C08G 18/16* | (2006.01) | |
| *C08G 18/48* | (2006.01) | |
| *C08J 5/18* | (2006.01) | |
| *C09D 175/08* | (2006.01) | |

(52) U.S. Cl.
CPC ........... *C08G 18/73* (2013.01); *C08G 18/022* (2013.01); *C08G 18/168* (2013.01); *C08G 18/1816* (2013.01); *C08G 18/225* (2013.01); *C08G 18/283* (2013.01); *C08G 18/289* (2013.01); *C08G 18/4833* (2013.01); *C08G 18/792* (2013.01); *C08G 18/809* (2013.01); *C08G 18/8064* (2013.01); *C08J 5/18* (2013.01); *C09D 175/08* (2013.01); *C08J 2375/08* (2013.01)

(58) Field of Classification Search
CPC .... C08G 18/73; C08G 18/289; C08G 18/022; C08G 18/8064; C08G 18/4833; C08G 18/168; C08G 18/1816; C08G 18/809; C08G 18/283; C08G 18/225; C08G 18/792; C09D 175/08; C08J 5/18; C08J 2375/08
See application file for complete search history.

(56) References Cited

U.S. PATENT DOCUMENTS

| | | | |
|---|---|---|---|
| 3,211,703 | A | 10/1965 | Gilman et al. |
| 3,330,828 | A | 7/1967 | Grogler et al. |
| 3,487,080 | A | 12/1969 | Matsui et al. |
| 3,640,967 | A | 2/1972 | König et al. |
| 3,996,223 | A | 12/1976 | Gupta et al. |
| 4,040,992 | A | 8/1977 | Bechara et al. |
| 4,255,569 | A | 3/1981 | Müller et al. |
| 4,288,586 | A | 9/1981 | Bock et al. |
| 4,324,879 | A | 4/1982 | Bock et al. |
| 4,379,905 | A | 4/1983 | Stemmler et al. |
| 4,419,513 | A | 12/1983 | Breidenbach et al. |

(Continued)

FOREIGN PATENT DOCUMENTS

| | | |
|---|---|---|
| CA | 2034622 A1 | 8/1991 |
| CA | 1335990 C | 6/1995 |

(Continued)

OTHER PUBLICATIONS

International Search Report for PCT/EP2016/075679 dated Jan. 19, 2017.

(Continued)

*Primary Examiner* — Rabon A Sergent
(74) *Attorney, Agent, or Firm* — Faegre Drinker Biddle & Reath LLP

(57) ABSTRACT

The present invention relates to novel modified polyisocyanurate plastics obtainable by catalytic trimerization of a composition A), wherein the composition A) comprises oligomeric modified polyisocyanates B) that are a reaction product of an oligomeric polyisocyanate B1) and at least one functionalizing reagent B2) reactive toward isocyanate groups, where the composition A) has a content of monomeric diisocyanates of not more than 20% by weight and where the at least one functionalizing reagent B2) reactive toward isocyanate groups has at least one functional group reactive toward isocyanate groups which is not an isocyanate group. The invention further relates to the process from which the polyisocyanurate plastics of the invention are obtainable, to the use of the polyisocyanurate plastics of the invention for production of coatings, films, semifinished products, composites and moldings, and to substrates coated with such a coating.

14 Claims, No Drawings

(56) References Cited

U.S. PATENT DOCUMENTS

| | | | |
|---|---|---|---|
| 4,487,928 A | 12/1984 | Richter et al. | |
| 4,499,253 A | 2/1985 | Kerimis et al. | |
| 4,514,525 A | 4/1985 | Ashida et al. | |
| 4,604,418 A | 8/1986 | Shindo et al. | |
| 4,663,377 A | 5/1987 | Hombach et al. | |
| 4,788,310 A | 11/1988 | Stein et al. | |
| 4,789,705 A | 12/1988 | Kase et al. | |
| 4,808,691 A | 2/1989 | König et al. | |
| 4,826,915 A | 5/1989 | Stein et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,252,696 A | 10/1993 | Laas et al. | |
| 5,364,955 A | 11/1994 | Zwiener et al. | |
| 5,489,663 A | 2/1996 | Brandt et al. | |
| 5,914,383 A | 6/1999 | Richter et al. | |
| 6,133,397 A | 10/2000 | O'Connor et al. | |
| 6,426,414 B1 | 7/2002 | Laas et al. | |
| 6,613,863 B2 | 9/2003 | Kohlstruk et al. | |
| 6,635,761 B1 | 10/2003 | Revelant et al. | |
| 6,767,958 B2 | 7/2004 | Laas et al. | |
| 7,772,320 B2 | 8/2010 | Poppe et al. | |
| 7,875,693 B2 | 1/2011 | Bernard et al. | |
| 7,956,209 B2 | 6/2011 | Laas et al. | |
| 8,013,099 B2 | 9/2011 | Poppe et al. | |
| 8,119,799 B2 | 2/2012 | Binder et al. | |
| 8,569,438 B2 | 10/2013 | Groenewolt et al. | |
| 8,658,752 B2 | 2/2014 | Groenewolt et al. | |
| 9,017,818 B2 | 4/2015 | Groenewolt | |
| 9,353,210 B2 | 5/2016 | Laas et al. | |
| 9,353,287 B2 | 5/2016 | Groenewolt et al. | |
| 9,637,506 B2 | 5/2017 | Laas | |
| 9,796,876 B2 | 10/2017 | Lomoelder et al. | |
| 9,926,402 B2 | 3/2018 | Laas et al. | |
| 10,040,808 B2 | 8/2018 | Eggert | |
| 10,100,222 B2 | 10/2018 | Groenewolt et al. | |
| 2003/0027921 A1 | 2/2003 | Speier et al. | |
| 2009/0326146 A1 | 12/2009 | Sepeur et al. | |
| 2011/0082273 A1 | 4/2011 | Laas et al. | |
| 2015/0037590 A1 | 2/2015 | Groenewolt et al. | |
| 2016/0108280 A1 | 4/2016 | Hallack et al. | |
| 2017/0044296 A1 | 2/2017 | Harada | |

FOREIGN PATENT DOCUMENTS

| | | |
|---|---|---|
| CA | 2139535 A1 | 8/1995 |
| CA | 2244486 A1 | 2/1999 |
| CA | 2253119 A1 | 5/1999 |
| DE | 1570540 A1 | 3/1970 |
| DE | 1954093 A1 | 6/1970 |
| DE | 1670666 A1 | 7/1971 |
| DE | 1770245 A1 | 10/1971 |
| DE | 1667309 A1 | 9/1972 |
| DE | 2426440 A1 | 1/1975 |
| DE | 2414413 A1 | 10/1975 |
| DE | 2452532 A1 | 5/1976 |
| DE | 2631733 A1 | 2/1977 |
| DE | 2641380 A1 | 3/1978 |
| DE | 3100263 A1 | 8/1982 |
| DE | 3219608 A1 | 9/1983 |
| DE | 3240613 A1 | 5/1984 |
| DE | 3700209 A1 | 7/1988 |
| DE | 3717060 A1 | 12/1988 |
| DE | 3900053 A1 | 7/1990 |
| DE | 3928503 A1 | 3/1991 |
| DE | 10142816 A1 | 7/2002 |
| EP | 0003765 A1 | 9/1979 |
| EP | 010589 A1 | 5/1980 |
| EP | 0013880 A1 | 8/1980 |
| EP | 0033581 A1 | 8/1981 |
| EP | 0047452 A1 | 3/1982 |
| EP | 0056158 A1 | 7/1982 |
| EP | 0056159 A1 | 7/1982 |
| EP | 0100129 A1 | 2/1984 |
| EP | 0102482 A2 | 3/1984 |
| EP | 0206059 A2 | 12/1986 |
| EP | 0330966 A2 | 9/1989 |
| EP | 0336205 A2 | 10/1989 |
| EP | 0339396 A1 | 11/1989 |
| EP | 0379914 A2 | 8/1990 |
| EP | 0443167 A1 | 8/1991 |
| EP | 0540985 A1 | 5/1993 |
| EP | 0596360 A1 | 5/1994 |
| EP | 0668271 A1 | 8/1995 |
| EP | 0671426 A1 | 9/1995 |
| EP | 0798299 A1 | 10/1997 |
| EP | 0896009 A1 | 2/1999 |
| EP | 0916647 A2 | 5/1999 |
| EP | 0959087 A1 | 11/1999 |
| EP | 1229016 A2 | 8/2002 |
| EP | 1273640 A2 | 1/2003 |
| EP | 1287052 A1 | 3/2003 |
| EP | 1599526 A1 | 11/2005 |
| EP | 2014692 A2 | 1/2009 |
| EP | 2305691 A1 | 4/2011 |
| GB | 809809 A | 3/1959 |
| GB | 952931 A | 3/1964 |
| GB | 966338 A | 8/1964 |
| GB | 1145952 A | 3/1969 |
| GB | 1244416 A | 9/1971 |
| GB | 1386399 A | 3/1975 |
| GB | 1391066 A | 4/1975 |
| GB | 1415957 A | 12/1975 |
| GB | 2221465 A | 2/1990 |
| GB | 2222161 A | 2/1990 |
| WO | WO-99023128 A1 | 5/1999 |
| WO | WO-0188006 A1 | 11/2001 |
| WO | WO-2004078820 A1 | 9/2004 |
| WO | WO-2005070942 A2 | 8/2005 |
| WO | WO-2005087828 A1 | 9/2005 |
| WO | WO-2006042584 A1 | 4/2006 |
| WO | WO-2007033786 A1 | 3/2007 |
| WO | WO-2008034409 A2 | 3/2008 |
| WO | WO-2008074489 A1 | 6/2008 |
| WO | WO-2008074490 A1 | 6/2008 |
| WO | WO-2009156148 A1 | 12/2009 |
| WO | WO-2010149236 A1 | 12/2010 |
| WO | WO-2012168079 A1 | 12/2012 |
| WO | WO-2013167404 A1 | 11/2013 |
| WO | WO-2013189882 A2 | 12/2013 |
| WO | WO-2014037265 A1 | 3/2014 |
| WO | WO-2014037279 A1 | 3/2014 |
| WO | WO-2014086530 A1 | 6/2014 |
| WO | WO-2014180623 A1 | 11/2014 |
| WO | WO-2015113919 A1 | 8/2015 |
| WO | WO-2015166983 A1 | 11/2015 |

OTHER PUBLICATIONS

International Search Report for PCT/EP2016/075686 dated Jan. 10, 2017.

International Search Report for PCT/EP2016/075689 dated Jan. 19, 2017.

Written Opinion of the International Searching Authority for PCT/EP2016/075679 dated Jan. 19, 2017.

Written Opinion of the International Searching Authority for PCT/EP2016/075686 dated Jan. 10, 2017.

Written Opinion of the International Searchina Authority for PCT/EP2016/075689 dated Jan. 19, 2017.

Flipson, "Design, synthesis and properties of new materials based on densely crosslinked polymers for polymer optical fiber and amplifier applications", http://www.rug.nl/research/portal/files/3117200/thesis.pdf, (Jan. 1, 2000).

HYDROPHILICALLY MODIFIED POLYISOCYANURATE PLASTIC AND PROCESS FOR PRODUCTION THEREOF

CROSS-REFERENCE TO RELATED APPLICATIONS

This application is a national stage application (under 35 U.S.C. § 371) of PCT/EP2016/075679, filed Oct. 25, 2016, which claims benefit of European Application No. 16166433.9, filed Apr. 21, 2016, both of which are incorporated herein by reference in their entirety.

The invention relates to a modified polyisocyanurate plastic, to a process for production thereof, to the use thereof for producing coatings, films, semifinished products, composite materials or moldings and also to substrates coated with such a coating.

Polymers having a polyisocyanurate structure are known for their chemicals and heat resistance and for their high mechanical strength. The present processes known from the prior art for producing such highly converted polyisocyanurate plastics proceed from liquid monomeric diisocyanates. Due to the high evolution of heat from the trimerization reaction to afford polyisocyanurates (−75 kJ/mol NCO), a reaction proceeding from monomeric diisocyanates, particularly in the case of monomeric diisocyanates having a high isocyanate content (e.g. BDI, PDI, HDI, TIN), is typically not possible on a large scale but only in small amounts of substance under strict temperature control.

Temperature control during the production of highly converted polyisocyanurates is of enormous importance since, due to the high isocyanate contents of the monomeric starting materials and the exothermic reaction, temperatures of more than 300° C. can arise, which can result in direct decomposition of the products and even in in situ evaporation of the monomeric diisocyanates. In addition to the occupational hygiene disadvantages due to the liberated toxic monomeric diisocyanates or decomposition products, the formation of bubbles and discolorations in the finished polyisocyanurate plastic is very disruptive here.

WO 2015/166983 describes polyisocyanurate plastics obtained by polymerization of oligomeric polyisocyanates. The use of these plastics as a potting compound for LEDs is likewise described. The use of hydrophilically modified polyisocyanates as raw material is not disclosed.

U.S. Pat. No. 6,133,397 describes the production of coatings by polymerization of oligomeric polyisocyanates. Not disclosed is the production of moldings and the use of hydrophilically modified starting polyisocyanates.

Consequently, polyisocyanurates have hitherto usually only found practical applications as crosslinking agents in coatings chemistry, the production of which involves stopping the trimerization reaction at low conversions and removing excess unreacted monomeric diisocyanate. Thus, DE 31 00 263; GB 952 931, GB 966 338; U.S. Pat. Nos. 3,211,703, 3,330,828 envisage conducting the reaction either in dilution or only up to low conversion values with very precise temperature control during the production of crosslinking agents based on isocyanates starting from aliphatic and mixed aliphatic and aromatic monomeric diisocyanates. Highly converted polyisocyanurate plastics are specifically not formed, only oligomeric, low-viscosity, soluble products.

A common feature of the processes known from the prior art is that the trimerization is started at low temperatures. Higher trimerization temperatures, particularly at the start of the trimerization, can be controlled only with difficulty proceeding from monomeric diisocyanates, and lead to considerable side reactions in the form of uretdiones and carbodiimides, and are thus the cause of bubble formation as a result of carbon dioxide elimination and discoloration of the product obtained. The sole exception is trimerization in the presence of high concentrations of extremely sluggish catalysts, for example tributyltin oxide. The thus conducted preliminary reactions, which typically take several hours, to give low isocyanate conversions of about 50% at temperatures above 100° C. are too costly and inconvenient for production of three-dimensional objects from polyisocyanurate plastic and are therefore of no interest on the industrial scale.

A further feature common to the processes described is that they are not suitable for obtaining in efficient industrial processes highly converted polyisocyanurates having a low residual content of free isocyanate groups, especially those substantially free of disruptive defects in the form of discoloration, inhomogeneity and for example unwanted bubbles. Nor is it possible in this way, by the processes known from the prior art, to effect polymerization at elevated temperatures in open reaction vessels without risking significant release of monomeric diisocyanates into the environment. By contrast, industrially efficient processes feature high conversion rates and high process safety in terms of occupational hygiene.

Highly integrated novel technologies, for example in the field of communications, in transport, in medicine, in microelectronics and in microsystems technology, and for the effective generation, storage and utilization of energy, require materials having novel, precisely defined properties and optimized functionalities. Plastics have a high potential for this purpose, since they can be tailored for a multitude of applications and can also themselves assume functions.

Current processes are attempting to unlock this potential by the development of functional polymers and nanostructured (hybrid) materials. Their aim is the exact adjustment of the architecture, functionality, self-assembly and nanostructure of plastics.

It is generally desirable for integration of function that the materials can be incorporated into highly integrated components and complex material composites with the desired functionality and morphology in a reproducible manner, with long-term stability in terms of their function, and in an environmentally compatible and inexpensive manner.

The processes known from the prior art for homogeneously functionalizing a plastic in a desirable manner very predominantly follow the following strategies:

Firstly functionality is realized by adding functional additives and fillers to the plastic. Thus, for example, it is possible to achieve isotropic and anisotropic electrical conductivity, and in some cases even thermal conductivity, by incorporating conductive blacks, carbon nanotubes or graphenes into the plastic. A drawback of this approach is that the properties of the bulk material are altered with increasing additive or filler content in the course of incorporation of the additives or fillers. For example a lack of compatibility and a lack of covalent bonds between the additive/filler and the plastic often results in the formation of unbridged phase boundaries which impair the mechanical properties of the plastic.

Secondly, for many applications it is sufficient to functionalize only the surface of finished plastics known from the prior art.

As an alternative to these approaches which have been proven in practice it is in principle also conceivable to proceed from an already functionalized monomer building block which is then homopolymerized or copolymerized to afford a functionalized plastic. However, this approach often proves difficult in practice.

Particularly in the field of polyisocyanurate plastics this alternative procedure for modifying a plastic to achieve a modified polyisocyanurate plastic was, depending on the desired functionalization of the polyisocyanurate plastic, a real challenge on account of its already difficult-to-control production.

Unmodified polyisocyanurate plastics are rather hydrophobic. However, for many applications, in particular in the coatings or adhesives field, polar/slightly hydrophilic materials are required to allow adhesion on other substrates or else to allow adhesion of adhesives or coatings, for example lacquers, on the polyisocyanurate plastics. Furthermore, hydrophilic lacquers are used as antifog/coatings in the spectacles and optical lenses sector.

The problem addressed by the invention was accordingly that of developing an efficient industrial process for producing highly converted hydrophilically modified polyisocyanurate plastics featuring high transparency and good mechanical properties. These modified polyisocyanurate plastics should ideally lack defects such as bubbles, streaks and discoloration.

This problem is solved in accordance with the invention by the polyisocyanurate plastic specified in claim 1, by the uses and articles of manufacture specified in claims 14 to 16 and by the process specified in claim 17.

Advantageous configurations of the invention are specified in the dependent claims and are elucidated in detail hereinbelow, as is the general inventive concept.

The invention provides a modified polyisocyanurate plastic obtainable by catalytic trimerization of a composition A), wherein the composition A) contains oligomeric, modified polyisocyanates B) which constitute a reaction product of an oligomeric polyisocyanate B1) and at least one isocyanate-reactive functionalization reagent B2), wherein the composition A) has a content of monomeric diisocyanates of not more than 20% by weight and wherein the at least one isocyanate-reactive functionalization reagent B2) comprises at least one isocyanate-reactive functional group which is not an isocyanate group.

The modified polyisocyanurate plastic according to the invention is producible by the following process which likewise forms part of the subject matter of the invention. The process according to the invention comprises the steps of:

a1) providing a composition A) containing oligomeric, modified polyisocyanates B) and not more than 20% by weight of monomeric diisocyanates based on the weight of the composition A), wherein the oligomeric modified polyisocyanates B) constitute a reaction product of an oligomeric polyisocyanate B1) and at least one isocyanate-reactive functionalization reagent B2), and wherein the at least one isocyanate-reactive functionalization reagent B2) comprises at least one isocyanate-reactive functional group which is not an isocyanate group;

a2) catalytic trimerization of the composition A).

Also forming part of the subject matter of the invention is the use of the polyisocyanurate plastics according to the invention for producing coatings, adhesives, films, semifinished products, composite materials and moldings and also substrates coated with the polyisocyanurate plastic according to the invention.

The invention more particularly described hereinbelow is based on the surprising observation that a composition containing oligomeric, modified polyisocyanates may be cured by catalytic trimerization such that highly converted, transparent, bubble-free modified polyisocyanurate plastics having novel properties are formed. It was especially surprising that the trimerization reaction results in highly converted, transparent, bubble-free polyisocyanurate plastics despite the oligomeric, modified polyisocyanates being obtained by reaction of oligomeric polyisocyanates with hydrophilic functionalization reagents. Despite the high hydrophilicity of the oligomeric, modified polyisocyanates the expected secondary reactions of the isocyanate groups with water/atmospheric humidity which by elimination of carbon dioxide can result in ureas and thus in modified polyisocyanurates which have a severe bubble content, are cloudy and are of only limited use, were surprisingly not observed.

Furthermore, a person skilled in the art would expect that, for example in the case of starting polyisocyanates modified with hydrophilic groups, problems in terms of demixing and inhomogeneity-causing self-organization into hydrophilic and hydrophobic regions within the modified polyisocyanurate plastic could arise. However, the modified polyisocyanurate plastics obtainable according to the invention surprisingly do not appear to have any disadvantageous properties associated therewith.

The use of compositions containing oligomeric, modified polyisocyanates instead of monomeric diisocyanates as starting materials for producing modified polyisocyanurate plastics has moreover exhibited the advantage that, on account of the lower isocyanate contents of the oligomeric starting materials, a markedly lower heat of reaction requires removal during the curing, which in particular permits a rapid trimerization reaction with short reaction times and high temperatures.

A "polyisocyanurate plastic" as used herein is a plastic containing polyisocyanurate. It may also consist predominantly of a polyisocyanurate. Blends composed of polyisocyanurates and other plastics are likewise covered by the term "polyisocyanurate plastic" as used here.

When reference is made here to "plastic", this means a product which is very substantially dimensionally stable at room temperature—in contrast, for example, to gels or liquids. The term "plastic" as used here includes all customary classes of plastic, i.e. especially including thermosets, thermoplastics and elastomers.

A "polyisocyanurate" as used here is any molecule, preferably a polymer, having a plurality of isocyanurate structural units, for example at least 10 isocyanurate structural units. A molecule having a single isocyanurate structural unit can be referred to as "isocyanurate".

The characteristic cyclic isocyanurate structural unit is shown in the following structural formula:

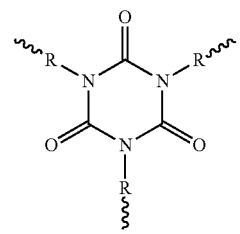

Isocyanurates and polyisocyanurates can be obtained by cyclotrimerization of polyisocyanates. The conventionally operated cyclotrimerization proceeding from monomeric diisocyanates is—as described above—a strongly exothermic reaction. This can considerably restrict the use options and the levels of trimerization that are still achievable industrially and efficiently.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to produce a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

Where reference is made here to "polyisocyanates" in general terms, this means monomeric and/or oligomeric polyisocyanates alike. For understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The production of oligomeric polyisocyanates from monomeric diisocyanates is also referred to here as oligomerization of monomeric diisocyanates. This "oligomerization" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

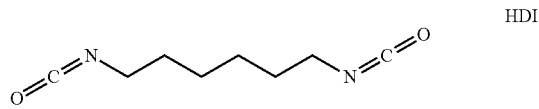 [SMILES: O=C=NCCCCCCN=C=O]

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

(idealized structural formulae)

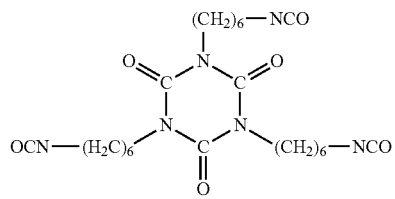

HDI isocyanurate

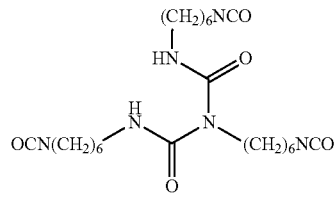

HDI biuret

The modified polyisocyanurate plastic according to the invention is obtainable by the process according to the invention. Described hereinbelow therefore are embodiments relevant both to the inventive modified polyisocyanurate plastic obtainable by the process according to the invention and to the process according to the invention as such.

According to the invention the composition A) used as reactant for producing the inventive modified polyisocyanurate plastic is low in monomers (i.e. low in monomeric diisocyanates) and already contains oligomeric, modified polyisocyanates B).

In one embodiment of the invention, the composition A) consists entirely or to an extent of at least 80%, 85%, 90%, 95%, 98%, 99% or 99.5% by weight, based in each case on the weight of the composition A), of oligomeric, modified polyisocyanates B).

The presence of oligomeric, modified polyisocyanates B) provided for in accordance with the invention and the contents specified therefor relate to the composition A) provided originally, i.e. before commencement of the catalytic trimerization, i.e. these are not for instance formed during the process as intermediate products but rather the oligomeric, modified polyisocyanates B) are already present in the composition A), employed as the reactant in the catalytic trimerization, at commencement of the reaction as a reaction product of an oligomeric polyisocyanate B1) and at least one isocyanate-reactive functionalization reagent B2).

The process according to the invention forms modified polyisocyanurate plastics having a very substantially homogeneous distribution of the modification in the polyisocyanurate plastic, i.e. the product is not a polyisocyanurate plastic modified exclusively at the surface.

The terms "low in monomers" and "low in monomeric diisocyanates" are here used synonymously in relation to the composition A).

Results of particular practical relevance are established when the composition A) has a proportion of monomeric diisocyanates in the composition A) of not more than 20% by weight, especially not more than 15% by weight or not more than 10% by weight, based in each case on the weight of the composition A). It is preferable when the composition A) has a content of monomeric diisocyanates of not more than 5% by weight, preferably not more than 2.0% by weight, particularly preferably not more than 1.0% by weight, based in each case on the weight of the composition A). Particularly good results are established when the composition A) is essentially free of monomeric diisocyanates. "Essentially free" means here that the content of monomeric diisocyanates is not more than 0.5% by weight, based on the weight of the composition A).

It is essential to the invention that the composition A) used is low in monomers. In practice this can be achieved in particular when in the production of the oligomeric polyisocyanate B1) which serves as reactant for the production of the oligomeric, modified polyisocyanate B) the actual oligomerization reaction is in each case followed by at least one further process step for removal of unconverted excess monomeric, modified diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

According to the invention the composition A) contains oligomeric, modified polyisocyanates B) which constitute a reaction product of an oligomeric polyisocyanate B1) and at least one isocyanate-reactive functionalization reagent B2).

In a preferred embodiment of the invention the oligomeric polyisocyanates B1) are obtained by oligomerization of monomeric diisocyanates with subsequent removal of unconverted monomers.

The processes for producing polyisocyanurate plastics described in the prior art use very substantially monomeric diisocyanates as reactants, i.e. pure monomeric diisocyanates or monomer-rich polyisocyanate compositions are catalytically trimerized. By contrast, the inventive use, i.e. the "provision" of a low-monomer composition A) already containing oligomeric, modified polyisocyanates B), surprisingly leads to markedly lower volume shrinkage. The lower exothermicity of the reaction according to the invention additionally makes it possible to obtain highly converted polyisocyanurate plastics.

It is preferable when no monomeric diisocyanate is used in the trimerization reaction according to the invention. However, in one particular embodiment of the invention the composition A) may comprise an outside monomeric diisocyanate. In this context, "outside monomeric diisocyanate" means that said diisocyanate differs from the monomeric diisocyanates used for producing the oligomeric polyisocyanates B1). An addition of outside monomeric diisocyanate may be advantageous for achieving specific technical effects, for example a particular hardness. Results of particular practical relevance are established when the composition A) has a proportion of outside monomeric diisocyanate in the composition A) of not more than 20% by weight, especially not more than 15% by weight or not more than 10% by weight, based in each case on the weight of the composition A). It is preferable when the composition A) has a content of outside monomeric diisocyanate of not more than 5% by weight, preferably not more than 2.0% by weight, particularly preferably not more than 1.0% by weight, based in each case on the weight of the composition A).

In a further particular embodiment of the invention, the composition A) may contain monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the polyisocyanurate plastic. Results of particular practical relevance are established when the composition A) has a proportion of monomeric monoisocyanates or monomeric isocyanates having an isocyanate functionality greater than two in the composition A) of not more than 20% by weight, especially not more than 15% by weight or not more than 10% by weight, based in each case on the weight of the composition A). It is preferable when the composition A) has a content of monomeric monoisocyanates or monomeric isocyanates having an isocyanate functionality greater than two of not more than 5% by weight, preferably not more than 2.0% by weight, particularly preferably not more than 1.0% by weight, based in each case on the weight of the composition A). It is preferable when no monomeric monoisocyanate or monomeric isocyanate having an isocyanate functionality greater than two is used in the trimerization reaction according to the invention.

The oligomeric polyisocyanates B1) are typically obtained by oligomerization of simple aliphatic, cycloaliphatic, araliphatic and/or aromatic monomeric diisocyanates or mixtures of such monomeric diisocyanates.

According to the invention the oligomeric polyisocyanates B1) may in particular comprise uretdione, isocyanurate, allophanate, biuret, iminooxadiazinedione and/or oxadiazinetrione structure. In one embodiment of the invention, the oligomeric polyisocyanates B1) comprise at least one of the following oligomeric structure types or mixtures thereof:

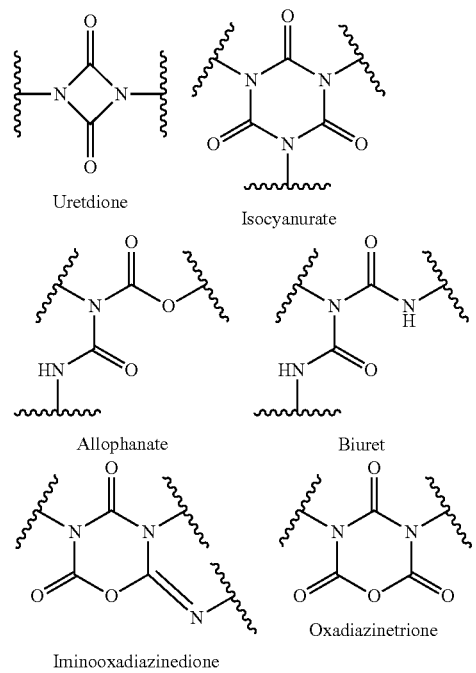

Uretdione
Isocyanurate
Allophanate
Biuret
Iminooxadiazinedione
Oxadiazinetrione

In a particularly preferred embodiment of the invention the oligomeric polyisocyanates B1) contain at least one structure selected from the group consisting of uretdione, isocyanurate, biuret, iminooxadiazinedione and oxadiazinetrione but are essentially allophanate-free. In this context the term "allophanate-free" means that the molar ratio of allophanate groups to all of the abovementioned groups present in the oligomeric polyisocyanate B1) is preferably less than 1:99. It is more preferable when the molar ratio of allophanate groups to isocyanurate groups is below 1:99. It is particularly preferable when the oligomeric polyisocyanate B1) contains no allophanate groups. All of the other definitions given hereinabove in relation to the oligomeric polyisocyanate B1 also apply to this embodiment.

It has been found that, surprisingly, it can be advantageous to use oligomeric, modified polyisocyanates B) that constitute a mixture of at least two oligomeric, modified polyisocyanates B), where the at least two oligomeric, modified polyisocyanates B) differ in terms of their structure. The oligomeric structure of the oligomeric, modified polyisocyanates B) is preferably selected from the group consisting of uretdione, isocyanurate, allophanate, biuret, iminooxadiazinedione and oxadiazinetrione structure and mixtures thereof. Particularly compared to trimerization reactions with oligomeric, modified polyisocyanates B) of just one defined structure, starting mixtures of this kind can lead to an effect on the Tg value, which is advantageous for many applications.

It is preferable to employ in accordance with the invention a composition A) containing oligomeric, modified polyisocyanates B) having biuret, allophanate, isocyanurate and/or iminooxadiazinedione structure and mixtures thereof.

In another embodiment, the composition A) is one containing oligomeric, modified polyisocyanates B) of only a single defined oligomeric structure, for example exclusively or for the most part isocyanurate structure. However, as a consequence of production the composition A) generally always contains oligomeric, modified polyisocyanates B) of a plurality of different oligomeric structures simultaneously.

According to the invention in a further embodiment oligomeric, modified polyisocyanates B) of a single defined oligomeric structure are used, the oligomeric structure being selected from uretdione, isocyanurate, allophanate, biuret, iminooxadiazinedione and/or oxadiazinetrione structure.

In a further embodiment, the oligomeric, modified polyisocyanates B) are those which have mainly isocyanurate structure and which may contain the abovementioned uretdione, allophanate, biuret, iminooxadiazinedione and/or oxadiazinetrione structure only as by-products.

It is likewise possible in accordance with the invention to use oligomeric, modified polyisocyanates B) having very substantially no isocyanurate structure, and containing mainly at least one of the abovementioned uretdione, allophanate, biuret, iminooxadiazinedione and/or oxadiazinetrione structure types. In a particular embodiment of the invention the composition A) contains oligomeric, modified polyisocyanates B) having a structure type selected from the group consisting of uretdione, allophanate, biuret, iminooxadiazinedione and/or oxadiazinetrione structure.

The uretdione, isocyanurate, allophanate, biuret, iminooxadiazinedione and/or oxadiazinetrione structure in the oligomeric, modified polyisocyanates B) and the oligomeric polyisocyanates B1) can be determined, for example, by NMR spectroscopy. Preferably employable here is $^{13}C$ NMR spectroscopy, preferably in proton-decoupled form, since the recited oligomeric structures give characteristic signals.

Irrespective of the underlying oligomeric structure type (uretdione, isocyanurate, allophanate, biuret, iminooxadiazinedione and/or oxadiazinetrione structure) the oligomeric polyisocyanates B1) used according to the invention for producing the modified, oligomeric polyisocyanates B) preferably have an (average) NCO functionality of 2.0 to 5.0, preferably of 2.3 to 4.5.

Irrespective of the underlying oligomeric structure type (uretdione, isocyanurate, allophanate, biuret, iminooxadiazinedione and/or oxadiazinetrione structure) the oligomeric, modified polyisocyanates B) present in the composition A) according to the invention preferably have an (average) NCO functionality of 1.8 to 6.0, preferably of 2.0 to 5.0.

Results of particular practical relevance are established when the composition A) to be used in accordance with the invention has a content of isocyanate groups of 8.0% to 28.0% by weight. It has been found to be of particular practical relevance when the composition A) according to the invention has a content of isocyanate groups of 14.0% to 25.0% by weight, based in each case on the weight of the composition A).

Production processes for the oligomeric polyisocyanates B1) with uretdione, isocyanurate, allophanate, biuret, iminooxadiazinedione and/or oxadiazinetrione structure to be used according to the invention for producing the oligomeric, modified polyisocyanates B) are described, for example, in J. Prakt, Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

Suitable monomeric polyisocyanates for producing the oligomeric polyisocyanates B1) are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates which are likewise suitable may additionally be found, for example, in *Justus Liebigs Annalen der Chemie* Volume 562 (1949) p. 75-136.

In addition, it is also possible according to the invention to use conventional prepolymers bearing aliphatic or aromatic isocyanate end groups, for example polyether, polyester, polyacrylate, polyepoxide or polycarbonate prepolymers bearing aliphatic or aromatic isocyanate end groups, as mono- and polyisocyanates in the composition A).

Suitable monomeric monoisocyanates which can optionally be used in the composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the composition A) is 4-isocyanatomethyloctane 1,8-diisocyanate (triisocyanatononane; TIN).

In one embodiment of the invention, the composition A) contains not more than 30% by weight, especially not more than 20% by weight, not more than 15% by weight, not more than 10% by weight, not more than 5% by weight or not more than 1% by weight, based in each case on the weight of the composition A), of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the invention, a composition A) having exclusively aliphatically and/or cycloaliphatically bonded isocyanate groups is used.

Aliphatically and cycloaliphatically bonded isocyanate groups are respectively understood to mean isocyanate groups bonded to an aliphatic and cycloaliphatic hydrocarbyl radical.

In another preferred embodiment of the invention, a composition A) containing one or more oligomeric, modified polyisocyanates B) is used, wherein the one or more oligomeric polyisocyanates B) comprise exclusively aliphatically and/or cycloaliphatically bonded isocyanate groups. Practical experiments have shown that particularly good results can be achieved with compositions A) in which the oligomeric polyisocyanates present therein comprise exclusively aliphatically and/or cycloaliphatically bonded isocyanate groups.

In a particularly preferred embodiment of the invention a composition A) containing one or more oligomeric, modified polyisocyanates B) which constitute a reaction product of one or more oligomeric polyisocyanates B1) and at least one isocyanate-reactive functionalization reagent B2) is employed, wherein the one or more oligomeric polyisocyanates B1) are constructed on the basis of 1,5-diisocyanatopentane (PDI), 1,6-diisocyanatohexane (HDI), isophorone diisocyanate (IPDI), 1,3-bis(isocyanatomethyl)cyclohexane, 1,4-bis(isocyanatomethyl)cyclohexane, 2,4'-diisocyanatodicyclohexylmethane or 4,4'- diisocyanatodicyclohexylmethane (H12MDI) or mixtures thereof.

The oligomeric, modified polyisocyanates B) employed in the composition A) in the catalytic trimerization preferably have a low viscosity. When reference is made here to "low viscosity" this means that the oligomeric, modified polyisocyanates B) have at room temperature a viscosity below the gel point of the oligomeric, modified polyisocyanates B), i.e. the oligomeric, modified polyisocyanates B) are in the form of a liquid and not a gel. The gel point is understood to mean the time at which the crosslinking density of the oligomeric, modified polyisocyanates B) has progressed to an extent such that the viscosity of the oligomeric, modified polyisocyanates B) abruptly increases and the oligomeric, modified polyisocyanates B) gel to afford a polyisocyanurate bulk material, i.e. no longer undergo substantial deformation or flow.

It is an essential feature of the present invention that oligomeric, modified polyisocyanates B) are used as starting materials for the modified polyisocyanurate plastics obtainable according to the invention. Oligomeric, modified polyisocyanates are known in principle from the prior art and described for example in EP-A 0 206 059, EP-A 0 540 985, EP-A 0 959 087 and EP-A1 287 052. They have hitherto been used predominantly as crosslinker components for aqueous lacquer and adhesive formulations.

The oligomeric, modified polyisocyanates B) to be used according to the invention are preferably nonionic oligomeric, modified polyisocyanates B). In addition or alternatively thereto the oligomeric, modified polyisocyanates B) are oligomeric, hydrophilized polyisocyanates B). This means the oligomeric polyisocyanates B) are modified to contain hydrophilic and/or polar groups. Such hydrophilic and/or polar groups may in particular be OH or polyether groups. It is particularly preferable to use oligomeric, nonionic hydrophilized polyisocyanates B). Such polyisocyanates and the production thereof from an oligomeric polyisocyanate B1) and a hydrophilic-group-containing and isocyanate-reactive functionalization reagent B2) are known to the skilled person from the prior art and described for example in EP-A 0 206 059, EP-A 0 540 985, EP-A 0 959 087 and EP-A1 287 052. Oligomeric, nonionic hydrophilized polyisocyanates B) employable with preference according to the invention are commercially available for example as the Bayhydur® product range (Covestro Deutschland AG).

For the sake of simplicity the oligomeric, modified polyisocyanates B) are here defined on the basis of their starting materials, as the reaction product of which they are present in the composition A). Thus the oligomeric, modified polyisocyanates B) to be used according to the invention are here defined as the reaction product of two basis components: oligomeric polyisocyanate B1) and at least one isocyanate-reactive functionalization reagent B2). The oligomeric polyisocyanate B1) is modified by the functionalization reagent B2) to afford the "oligomeric, modified polyisocyanate B)" as used here. The functionalization reagent B2) comprises at least one isocyanate-reactive group which reacts with the oligomeric polyisocyanate B1). In addition to this reactive group necessary for the coupling with the oligomeric polyisocyanate B1) the functionalization reagent B2) also contains at least one further functional group which is also preserved in the reaction product of B1) and B2), i.e. the "oligomeric, modified polyisocyanate B)". The oligomeric, modified polyisocyanate B) is then "modified" or "functionalized" with this additional functional group. This functional group is preferably a hydrophilic and/or polar group, for example polyether. The terms "modified" and "functionalized" are used synonymously here.

The oligomeric, modified polyisocyanates B) are typically obtained by partial reaction of oligomeric polyisocyanates B1) with at least one isocyanate-reactive functionalization reagent B2). The terms "partial reaction with at least one isocyanate-reactive functionalization reagent" or "modified" are used interchangeably in the context of the invention and mean in particular that 0.5 to 50, preferably 1 to 40, particularly preferably 2 to 30, mol % of the isocyanate groups originally present in the oligomeric polyisocyanate B1) has been reacted with at least one isocyanate-reactive functionalization reagent B2). In other words the oligomeric, modified polyisocyanates B) produced by partial reaction of oligomeric polyisocyanates B1) with at least one isocyanate-reactive functionalization reagent B2) have an isocyanate content of 50 to 95.5, preferably 99 to 60, particularly preferably 98 to 70, mol % based on the originally present isocyanate groups of the oligomeric polyisocyanates B1). As is made clear by the term oligomeric, modified polyisocyanates B), said polyisocyanates (on average) still comprise a plurality (at least two) of isocyanate groups, i.e. complete reaction of the isocyanate groups originally present in the oligomeric polyisocyanate B1) with the at least one isocyanate-reactive functionalization reagent B2) does not take place.

Isocyanate-reactive functionalization reagents B2) to be used in accordance with the invention for producing the oligomeric, modified polyisocyanates B) are for example compounds containing alcohol, thiol, amine, epoxide, anhydride, organic acid and/or isocyanate groups or mixtures thereof.

According to the invention the reactive functionalization reagent B2) to be used for producing the oligomeric, modified polyisocyanates B) comprises at least one isocyanate-reactive group, in particular per molecule, which is not an isocyanate group.

Preferably used as the functionalization reagent B2) is a hydrophilic compound, in particular a hydrophilic nonionic compound or a hydrophilic ionic compound. It is particularly preferable in accordance with the invention when a hydrophilic nonionic compound is used as the functionalization reagent B2) to be used for producing the oligomeric, modified polyisocyanates B).

The at least one isocyanate-reactive functionalization reagent B2) preferably has a surface tension of >20 mN/m and <70 mN/m.

In a preferred embodiment of the invention the functionalization reagent B2) is chosen such that after reaction with polyisocyanate B1) it increases the surface tension of B) by at least 2 mN/m, preferably by at least 5 mN/m, compared to B1.

In a further preferred embodiment the functionalization reagent B2) is chosen such that after reaction with the polyisocyanate B1) and catalytic trimerization of the composition A) it increases the surface energy of the polyisocyanurate plastic by at least 2 mN/m.

Examples of hydrophilic nonionic compounds suitable as functionalization reagent B2) are alcohols, amines, acids and derivatives thereof, epoxides and in particular polyols, for example sugars, polyacrylate polyols, polyester polyols, polyether polyols, polyvinyl alcohols, polycarbonate polyols, polyether carbonate polyols and polyester carbonate polyols.

Other preferred functionalization reagents are polyacrylic acid, polyamides, polysiloxanes, polyacrylamides, polyvinylpyrrolidones, polyvinyl butyrate, polyketones, polyether ketones, polyacetals and polyamines.

The polyols suitable in accordance with the invention as functionalization reagent B2) preferably have an OH functionality of ≥1 to ≤6. Preference is given to polyols having a number-average molecular weight of ≥100 g/mol to ≤2500 g/mol and an OH functionality of ≥1 to ≤3, particularly preferably ≤2. The number-average molecular weight can be determined in accordance with DIN 55672-1 by gel permeation chromatography (GPC) in tetrahydrofuran (THF) at 23° C.

The polycarbonates having hydroxyl groups that are useful in accordance with the invention as functionalization reagent B2) for producing the oligomeric, modified polyisocyanates B) are obtainable by reaction of carbonic acid derivatives, for example diphenyl carbonate, dimethyl carbonate or phosgene, with diols. Useful diols of this kind include, for example, ethylene glycol, propane-1,2- and -1,3-diol, butane-1,3- and -1,4-diol, hexane-1,6-diol, octane-1,8-diol, neopentyl glycol, 1,4-bishydraxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains ≥40% by weight to ≤100% by weight of hexanediol, preferably hexane-1,6-diol and/or hexanediol derivatives, especially those having ether or ester groups as well as terminal OH groups. Examples include products which have been obtained by reaction of 1 mol of hexanediol with at least 1 mol, preferably 1 to 2 mol, of caprolactone according to DE-A 1 770 245, or by etherification of hexanediol with itself to give di- or trihexylene glycol. The preparation of such derivatives is known, for example, from DE-A 1 570 540. The polyether polycarbonate diols described in DE-A 3 717 060 can also be used in accordance with the invention as functionalization reagent B2).

The hydroxyl polycarbonates usable in accordance with the invention as functionalization reagent B2) should preferably be linear. However, they may optionally be lightly branched by the incorporation of polyfunctional components, especially low molecular weight polyols. Suitable examples for this purpose are glycerol, trimethylolpropane, hexane-1,2,6-triol, butane-1,2,4-triol, trimethylolpropane, pentaerythritol, chitin, mannitol and sorbitol, methyl glycoside, 1,3,4,6-dianhydrohexitols.

Polyether polyols likewise usable in accordance with the invention as functionalization reagent B2) are polytetramethylene glycol polyethers which can be produced, for example, via polymerization of tetrahydrofuran by cationic ring opening.

In addition, inventive polyether polyols suitable as functionalization reagent B2) are the polyaddition products, produced using starter molecules, of ethylene oxide, propylene oxide, butylene oxide, styrene oxide or epichlorohydrin, and the mixed and graft polyaddition products thereof, and the polyethers obtained by condensation of polyhydric alcohols or mixtures thereof and those obtained by alkoxylation of water, polyhydric alcohols, amines or amino alcohols.

In a preferred embodiment, in accordance with the invention, homo- and/or copolyaddition compounds of ethylene oxide and/or propylene oxide are used.

Polyester polyols suitable for use as functionalization reagent B2) for producing the oligomeric, modified polyisocyanates B) are, for example, the known per se polycondensates of di- and optionally tri- and tetraols, and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols for producing the polyesters. Examples of diols suitable for this purpose are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate. Suitable dicarboxylic acids in this context are, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. It is also possible to use the corresponding anhydrides as acid source. Provided that the average functionality of the polyol to be esterified is greater than 2, it is additionally also possible to use monocarboxylic acids such as benzoic acid and hexanecarboxylic acid. Examples of hydroxycarboxylic acids that may be used as reaction participants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologs. Preference is given to caprolactone.

In a preferred embodiment of the invention, polyester polyols based on adipic acid and ethylene glycol, butane-1,4-diol, neopentyl glycol and/or hexane-1,6-diol are used as functionalization reagent B2).

Monofunctional alcohols and monoamines are also contemplated for use as functionalization reagent B2). Preferred monoalcohols are aliphatic monoalcohols having 1 to 18 carbon atoms, for example ethanol, n-butanol, ethylene glycol monobutyl ether, 2-ethylhexanol, 1-octanol, 1-dodecanol or 1-hexadecanol. Preferred monoamines are aliphatic monoamines, for example diethylamine, dibutylamine, ethanolamine, N-methylethanolamine or N,N-diethanolamine, and amines from the Jeffamine® M series (Huntsman Corp. Europe, Belgium) or amino-functional polyethylene oxides and polypropylene oxides.

Likewise suitable as functionalization reagent B2) are polyols, amino polyols or polyamines having a molar mass below 400 g/mol.

Nonionic hydrophilic compounds suitable as functionalization reagent B2) are, for example, polyoxyalkylene ethers containing at least one hydroxyl or amino group. These polyethers contain a proportion of 30% by weight to 100% by weight of ethylene oxide units. Useful compounds include polyethers of linear construction having a functionality between 1 and 3, but also compounds of the general formula (III)

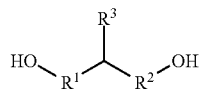

(III)

in which

R¹ and R² are each independently a divalent aliphatic, cycloaliphatic or aromatic radical which has 1 to 18 carbon atoms and may be interrupted by oxygen and/or nitrogen atoms, and R³ is an alkoxy-terminated polyethylene oxide radical.

Further hydrophilic nonionic compounds suitable as functionalization reagent B2) are polyether alcohols, in particular polyalkylene oxide polyether alcohols, preferably monohydric or polyhydric polyalkylene oxide polyether alcohols having a statistical average of 5 to 50 ethylene oxide units per molecule, as obtainable in a manner known per se by alkoxylation of suitable starter molecules (for example see Ullmanns Encyclopädie der technischen Chemie, 4th edition, volume 19, Verlag Chemie, Weinheim pp. 31-38). Starter molecules of this kind may be, for example, any mono- or polyhydric alcohols of the molecular weight range 32 to 300, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl)isocyanurate.

Alkylene oxides suitable for the alkoxylation reaction are especially ethylene oxide and propylene oxide, which can be used in the alkoxylation reaction in any sequence or else in a mixture. Suitable polyether alcohols are either pure polyethylene oxide polyether alcohols or mixed polyalkylene oxide polyethers, the alkylene oxide units of which consist to an extent of at least 70 mol %, preferably to an extent of at least 80 mol %, of ethylene oxide units.

In one embodiment of the invention the functionalization reagent B2) used for producing the oligomeric, modified polyisocyanate B) is a polyether alcohol.

In one preferred embodiment of the invention a polyalkylene oxide polyether alcohol is used as functionalization reagent B2) to produce the oligomeric, modified polyisocyanate B), in particular a polyalkylene oxide polyether alcohol produced using the abovementioned monoalcohols of molecular weight range 32 to 150 as starter molecules.

In a particularly preferred embodiment of the invention the functionalization reagent B2) used for producing the oligomeric, modified polyisocyanate B) is a polyether alcohol which is a pure polyethylene glycol monomethyl ether alcohol, in particular a polyethylene glycol monomethyl ether alcohol comprising a statistical average of 5 to 50, very particularly preferably 5 to 25, ethylene oxide units.

The production of such preferred oligomeric, modified polyisocyanates B) is known in principle and described for example in EP-A 0 206 059 and EP-A 0 540 985. It is generally carried out while maintaining an NCO/OH equivalent ratio of 2:1 to 6:1, preferably at temperatures of 40° C. to 180° C.

Examples of hydrophilic ionic compounds suitable according to the invention as functionalization reagent B2) which may be of either cationic or anionic nature include those which contain for example sulfonium, ammonium, phosphonium, carboxylate, sulfonate or phosphonate groups or groups which may be converted into the abovementioned groups by salt formation (potentially ionic groups) and due to the presence of isocyanate-reactive functional groups can react with isocyanate groups of the oligomeric polyisocyanate B1) to form the oligomeric, modified polyisocyanate B).

Suitable ionic or potentially ionic compounds which can be used as functionalization reagent B2) are, for example, mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and salts thereof, such as dimethylolpropionic acid, dimethylolbutyric acid, hydroxypivalic acid, N-(2-aminoethyl)-β-alanine, 2-(2-aminoethylamino)ethanesulfonic acid, propylene-1,2- or -1,3-diamine-β-ethylsulfonic acid, ethylenediaminepropyl- or -butylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and the alkali metal and/or ammonium salts thereof; the adduct of sodium bisulfite onto but-2-ene-1,4-diol, polyethersulfonate, the propoxylated adduct of 2-butenediol and $NaHSO_3$, described, for example, in DE-A 2 446 440 (pages 5-9, formulae I-III), and units that can be converted to cationic groups, such as N-methyldiethanolamine, as hydrophilic formation components. Preferred ionic or potentially ionic compounds are those having carboxyl or carboxylate and/or sulfonate groups and/or ammonium groups.

Particularly preferred ionic compounds usable in accordance with the invention as functionalization reagent B2) are those containing carboxyl and/or sulfonate groups as ionic or potentially ionic groups, such as the salts of N-(2-aminoethyl)-β-alanine, of 2-(2-aminoethylamino)ethanesulfonic acid or of the addition product of IPDI and acrylic acid (EP-A 0 916 647, Example 1) and of dimethylolpropionic acid. It is very particularly preferable when the functionalization reagent B2) is selected from the sodium salts of N-(2-aminoethyl)-β-alanine or 2-(2-aminoethylamino)ethanesulfonic acid or from dimethyipropionic acid. In an advantageous embodiment of the invention, both sodium salts of N-(2-aminoethyl)-β-alanine or 2-(2-aminoethylamino)ethanesulfonic acid and dimethylpropionic acid are used as functionalization reagent B2).

The use of amino acids as functionalization reagent B2) is also possible in accordance with the invention.

The production of the oligomeric, modified polyisocyanate B) by partial reaction of oligomeric polyisocyanates B1) with at least one isocyanate-reactive functionalization reagent B2) may be carried out in the presence of suitable catalysts B3) which promote the reaction of the functionalization reagent B2) with the oligomeric polyisocyanate B1). These catalysts are in particular commonly used catalysts B3) which catalyse the reaction of isocyanate-reactive compounds with isocyanates. Examples include urethanization catalysts, for example triethylamine, 1,4-diazabicyclo[2.2.2]octane, dibutyltin oxide, tin dioctoate, dibutyltin dilaurate, tin bis(2-ethylhexanoate), zinc dioctoate, zinc bis(2-ethylhexanoate) or other organometallic compounds. It has been found to be particularly practicable when a catalyst selected from dibutyltin dilaurate, zinc dioctoate and zinc bis(2-ethylhexanoate) is used as the catalyst B3). The catalyst B3) is preferably selected from zinc bis(2-ethylhexanoate) and catalysts B3) which promote the formation of oxazolidinones and also isocyanurates, and mixtures thereof. Furthermore, depending on the composition of the reaction mixture, choice of the functionalization reagent B2) and reaction conditions, the catalysts B3) may also be selected from the compounds enumerated hereinbelow for the catalysts C) in the appropriate amounts and optionally with use of the catalyst solvents specified below.

In a preferred embodiment of the invention the composition A) also contains oligomeric, unmodified polyisocyanates BU in addition to the above-described oligomeric, modified polyisocyanates B). Said oligomeric, unmodified polyisocyanates BU may be present in the composition A) since the functionalization of an oligomeric polyisocyanate B1) with the isocyanate-reactive functionalization reagent B2) does not result in functionalization of all of the oligomeric polyisocyanate molecules of B1). The degree of functionalization of the oligomeric, modified polyisocyanates B) is adjustable via the stoichiometric ratio of the oligomeric polyisocyanate B1) to the functionalization reagent B2). However, in the context of the present invention it is preferable for unmodified oligomeric polyisocyanates BU to be blended with the oligomeric modified polyisocyanates B) to produce the composition A).

The features of the unmodified oligomeric polyisocyanates BU) correspond to the features of the modified polyisocyanates B) defined above with the exception of the modification by the functionalization reagent B2) with which the polyisocyanates BU) are not reacted.

The weight fraction of modified polyisocyanates B) based on the total weight of oligomeric modified polyisocyanates B) and oligomeric unmodified polyisocyanates BU) is preferably at least 25% by weight, more preferably at least 40% by weight, yet more preferably at least 50% by weight, yet more preferably at least 60% by weight, yet more preferably at least 70% by weight, yet more preferably at least 80% by weight and most preferably at least 90% by weight.

The polyisocyanurates modified in accordance with the invention are obtainable by catalytic trimerization of the composition A) containing oligomeric, modified polyisocyanates B) by the process according to the invention. "Catalytic" here means in the presence of a suitable trimerization catalyst C).

Suitable catalysts C) for the process according to the invention are in principle any compounds which accelerate the trimerization of isocyanate groups to isocyanurate structures. It is preferable to use a trimerization catalyst C) which does not accelerate or does not significantly accelerate the trimerization reaction below 25° C., in particular below 30° C., preferably below 40° C., but significantly accelerates said reaction above 60° C., in particular above 70° C. "Does not significantly accelerate" here means that below 25° C., in particular below 30° C., preferably below 40° C., the presence of the trimerization catalyst C) in the reaction mixture does not have any significant effect on the reaction rate of the reaction that proceeds in any case. A significant acceleration is understood to mean that above 60° C., in particular above 70° C., the presence of the thermally latent catalyst in the reaction mixture has a distinct effect on the reaction rate of the reaction that proceeds in any case.

Since isocyanurate formation, depending on the catalyst used, is frequently accompanied by side reactions, for example dimerization to give uretdione structures or trimerization to form iminooxadiazinediones (called asymmetric trimers), and by allophanatization reactions in the case of presence of urethane groups in the starting polyisocyanate, the term "trimerization" shall also synonymously represent these reactions that proceed additionally in the context of the present invention.

In a particular embodiment, however, trimerization means that predominantly cyclotrimerizations of at least 50%, preferably at least 60%, particularly preferably at least 70%, in particular at least 80%, of the isocyanate groups present in the composition A) to give isocyanurate structural units are catalysed. However, side reactions, especially those to give uretdione, allophanate and/or iminooxadiazinedione structures, typically occur and can even be used in a controlled manner in order to advantageously affect, for example, the Tg of the polyisocyanurate plastic obtained.

Suitable catalysts C) for the process according to the invention are, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanoiamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts C) for the process of the invention are a multitude of different metal compounds. Suitable examples are the octoates and naphthenates of manganese, iron, cobalt, nickel, copper, zinc, zirconium, cerium or lead that are described as catalysts in DE-A 3 240 613, or mixtures thereof with acetates of lithium, sodium, potassium, calcium or barium, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex of titanium, zirconium and/or hafnium known from application EP 13196508.9, for example zirconium tetra-n-butoxide, zirconium tetra-2-ethylhexanoate and zirconium tetra-2-ethylhexoxide, and tin compounds of the type described in *European Polymer Journal*, vol. 16, 147-148 (1979), for example dibutyltin dichloride, diphenyltin dichloride, triphenylstannanol, tributyltin acetate, tributyltin oxide, tin octoate, dibutyl(dimethoxy)stannane and tributyltin imidazolate.

Further trimerization catalysts C) suitable for the process according to the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water with 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, such as N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl)ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N, N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, such as choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further catalysts C) suitable for the process according to the invention may be found, for example, in J. H. Saunders and K. C. Frisch, Polyurethanes Chemistry and Technology, p. 94 ff. (1962) and the literature cited therein.

The catalysts C) can be used in the process according to the invention either individually or in the form of any desired mixtures with one another.

Preferred catalysts C) are metal compounds of the aforementioned type, especially carboxylates and alkoxides of alkali metals, alkaline earth metals or zirconium, and organic tin compounds of the type mentioned.

Particularly preferred trimerization catalysts C) are sodium and potassium salts of aliphatic carboxylic acids having 2 to 20 carbon atoms and aliphatically substituted tin compounds.

Very particularly preferred trimerization catalysts C) for the process according to the invention are potassium acetate, tin dioctoate and/or tributyltin oxide.

In one embodiment of the invention catalytic trimerization is carried out in the presence of a trimerization catalyst C), wherein the trimerization catalyst C) preferably comprises at least one alkali metal or alkaline earth metal salt.

In a preferred embodiment of the invention the trimerization catalyst C) comprises potassium acetate as the alkali metal salt and/or a polyether, in particular a polyethylene glycol.

In the process according to the invention, the trimerization catalyst C) is generally used in a concentration based on the amount of the composition A) used of 0.0005% to 5.0% by weight, preferably of 0.0010% to 2.0% by weight and particularly preferably of 0.0015% to 1.0% by weight.

The trimerization catalysts C) that are used in the process of the invention generally have sufficient solubility in the composition A) in the amounts that are required for initiation of the oligomerization reaction. The catalyst C) is therefore preferably added to the composition A) in neat form.

Optionally, however, the catalysts C) can also be used dissolved in a suitable organic solvent to improve their incorporability. The dilution level of the catalyst solutions can be chosen freely within a very wide range. Such catalyst solutions are typically catalytically active above a concentration of about 0.01% by weight based on the total weight of catalyst C) and organic solvent.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

If catalyst solvents are used in the process of the invention, preference is given to using catalyst solvents which bear groups reactive toward isocyanates and can be incorporated into the polyisocyanurate plastic. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

The polyisocyanurate plastics obtainable by the process according to the invention, even as such, i.e. without addition of appropriate auxiliaries and additives D), feature very good light stability. Nevertheless, it is optionally possible to use standard auxiliaries and additives D) as well in the production thereof, for example standard fillers, UV stabilizers, antioxidants, mold release agents, water scavengers, slip additives, defoamers, levelling agents, rheology additives, flame retardants and/or pigments. These auxiliaries and additives D), excluding fillers and flame retardants, are typically present in the polyisocyanurate plastic in an amount of less than 10% by weight, preferably less than 5% by weight, particularly preferably up to 3% by weight, based on the composition A). Flame retardants are typically present in the polyisocyanurate plastic in amounts of not more than 70% by weight, preferably not more than 50% by weight, particularly preferably not more than 30% by weight, calculated as the total amount of employed flame retardants used, based on the total weight of the composition A).

Suitable fillers $D_w$) are, for example, $AlOH_3$, $CaCO_3$, metal pigments such as $TiO_2$ and further known standard fillers. These fillers $D_w$) are preferably used in amounts of not more than 70% by weight, preferably not more than 50% by weight, particularly preferably not more than 30% by weight, calculated as the total amount of fillers used, based on the total weight of the composition A).

Suitable UV stabilizers $D_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1,4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be employed either individually or in any desired combinations with one another.

Particularly preferred UV stabilizers $D_x$) for the polyisocyanurate plastics producible in accordance with the invention are those which fully absorb radiation of wavelength<400 nm. These include the recited benzotriazole derivatives for example. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

One or more of the UV stabilizers $D_x$) recited by way of example are optionally added to the composition A) preferably in amounts of 0.001 to 3.0 wt %, particularly preferably 0.01 to 2 wt %, calculated as the total amount of UV stabilizers used, based on the total weight of the composition A).

Suitable antioxidants $D_y$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required.

These antioxidants $D_y$) are preferably used in amounts of 0.01% to 3.0% by weight, particularly preferably 0.02% to 2.0% by weight, calculated as the total amount of antioxidants used, based on the total weight of the composition A).

Apart from the small amounts of any catalyst solvents to be used, the process according to the invention may be performed in a solvent-free manner. Especially in the case of the inventive use for production of coatings or films, the polyisocyanate component can optionally also be diluted with organic solvents to reduce the processing viscosity. Solvents suitable for this purpose are, for example, the catalyst solvents inert toward isocyanate groups that have already been described above.

In the case of the inventive use for production of films, semifinished products or moldings it is finally also possible to add internal mold release agents $D_z$) as further auxiliaries and additives D).

These are preferably the nonionic surfactants that contain perfluoroalkyl or polysiloxane units and are known as mold release agents, quaternary alkyl ammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic mono- and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mold release agents.

Particularly preferred mold release agents $D_z$) are the acidic mono- and dialkyl phosphates mentioned, very particularly preferably those having 8 to 12 carbon atoms in the alkyl radical.

Internal mold release agents $D_z$) are optionally used in the process according to the invention preferably in amounts of 0.01% to 3.0% by weight, particularly preferably 0.02% to 2.0% by weight, calculated as the total amount of internal mold release agents used, based on the total weight of the composition A).

In one embodiment of the process according to the invention, a trimerization catalyst C) or a mixture of different trimerization catalysts C) is added to the composition A) described, optionally under inert gas, for example nitrogen, and optionally with additional use of the aforementioned solvents and auxiliaries and additives D), and mixed in homogeneously with the aid of a suitable mixing unit. The addition of catalyst C) and any solvent and auxiliaries and additives D) to be used can be carried out in any sequence, successively or in a mixture, in the above-specified amounts and generally at a temperature of 0 to 100° C., preferably of 15 to 80° C., particularly preferably of 20 to 60° C.

The hereindescribed modified polyisocyanurate plastic according to the invention is suitable for producing coatings, films, semifinished products and moldings. Depending on the intended use the application of the reaction mixture may be carried out by different methods known per se.

For production of films or coatings, for example paints, a reaction mixture comprising catalyst C) and composition A) can be applied, for example, by spraying, spreading, dipping or flow-coating or with the aid of brushes, rollers or doctor blades, in one or more layers to any desired substrates, for example metal, wood, glass, stone, ceramic materials, concrete, hard and flexible plastics, textiles, leather and paper, which may optionally also be provided with standard primers prior to the coating.

The invention further provides a substrate coated with a coating containing the modified polyisocyanurate plastic according to the invention. The coating of the substrate with the coating containing the polyisocyanurate plastic according to the invention may be carried out by the abovementioned methods known per se. Either a reaction mixture comprising catalyst C) and composition A) may be applied to the substrate or a separate application of the catalyst C) and of the composition A) onto the substrate may be carried out. The catalytic trimerization of the composition A) may in the former case may be started either already before application onto the substrate by heating of the reaction mixture at temperatures as defined hereinbelow or by heating, for example, the substrate after application of the reaction mixture at temperatures as defined hereinbelow. The reaction mixture may be applied to a substrate already heated before application at temperatures as defined hereinbelow.

For production of solid bodies, for example semifinished products or moldings, the mixture of catalyst C) and composition A) can be introduced into open or closed molds, for example, by simple manual pouring, or with the aid of suitable machinery, for example the low-pressure or high-pressure machinery which is standard in polyurethane technology.

Subsequently, the trimerization reaction can be started by heating the coated substrates or filled molds for example, wherein depending on the trimerization catalyst C) chosen in each case the optimum reaction temperature is from 45° C. to 200° C., particularly preferably from 60° C. to 150° C., very particularly preferably from 80° C. to 140° C. The reaction temperature can be kept constant within the range specified over the entire curing process to give the polyisocyanurate, or else can be heated, for example, in a linear or stepwise manner up to a temperature greater than 80° C., preferably greater than 100° C., for example up to 130° C., over several hours. Where reference is made here to "reaction temperature", this means the ambient temperature.

Depending on the catalyst C) chosen and the reaction temperature chosen, the trimerization reaction is very substantially complete, as defined hereinbelow, after a period of less than one minute up to several hours or only after a number of days. It is preferable when the catalyst, catalyst amount and reaction temperature are chosen such that the reaction is complete in less than 24 hours, particularly preferably within 12 hours, very particularly preferably in less than 8 hours. The progress of the reaction can initially still be monitored by titrimetric determination of the NCO content, but gelation and solidification of the reaction mixture sets in rapidly as the reaction progresses, which makes wet-chemical analysis methods impossible. The further conversion of isocyanate groups can then be monitored only by spectroscopic methods, for example by IR spectroscopy with reference to the intensity of the isocyanate band at about 2270 $cm^{-1}$.

The modified polyisocyanurate plastics of the invention are preferably highly converted modified polyisocyanurates, i.e. those in which the trimerization reaction to give polyisocyanurate structures is very substantially complete. A trimerization reaction to give polyisocyanurate structures can be regarded as "very substantially complete" in the context of the present invention when at least 80%, preferably at least 90%, particularly preferably at least 95%, of the free isocyanate groups originally present in the composition A) have reacted. In other words only not more than 20%, not more than 10%, particularly preferably not more than 5%, of the isocyanate groups originally contained in the composition A) preferably remain present in the modified polyisocyanurate plastic according to the invention. This can be achieved when in the process according to the invention the catalytic trimerization is continued at least up to a degree of conversion at which only, for example, not more than 20% of the isocyanate groups originally contained in the composition A) preferably remain present, so that a highly converted polyisocyanurate plastic is obtained.

The percentage of isocyanate groups still present can be determined by comparison of the content of isocyanate groups in % by weight in the original composition A) with the content of isocyanate groups in % by weight in the reaction product, for example by the aforementioned comparison of the intensity of the isocyanate band at about 2270 cm$^{-1}$ by means of IR spectroscopy.

The process according to the invention provides transparent, bubble-free modified polyisocyanurate plastics which depending on the nature of the oligomeric, modified polyisocyanate B) used may contain not only isocyanurate structures and functional groups of the functionalization reagent B2) but also further oligomeric structures, such as urethane, uretdione, allophanate, biuret, iminooxadiazinedione and/or oxadiazinetrione structures.

The process according to the invention makes it possible to synthesize highly converted modified polyisocyanurate plastics having different properties, for example different degrees of hydrophilization, mechanical properties or glass transition temperatures in simple fashion by suitable selection of oligomeric, modified polyisocyanates B).

The invention features an advantageous modular principle in which a very large spectrum of modified polyisocyanurate plastics can be obtained through choice of a very wide variety of isocyanate-reactive functionalization reagents B2) while retaining the oligomeric polyisocyanate B1) and the reaction conditions of the catalytic trimerization. Practical experiments have shown that the properties of the modified polyisocyanurate plastic are critically dependent on the functional groups provided by the functionalization reagent B2) with which the polyisocyanurate plastic obtainable according to the invention is then modified. Accordingly, polyisocyanurate plastics having different properties may be achieved in simple fashion through suitable choice of this hydrophilic modification. The hydrophilic modification may be used for example to influence the adhesion of the polyisocyanurate plastics to various substrates or the adhesion of various materials to the polyisocyanurate plastics. Furthermore the hydrophilic modification can be used to influence the absorption or distribution of polar substances, for example water, on or in the polyisocyanurate plastic. One application therefor, for example, is antifog coatings in the spectacles and optical lenses sector.

Irrespective of the chosen modification, the modified polyisocyanurate plastics according to the invention further feature an unusually high crosslinking density based on the polyisocyanurate structure, thus making them suitable in particular for the manufacture of coatings having high chemicals resistance. The comparatively low heat of reaction liberated also allows for problem-free production of solid, large-volume moldings.

This combination of (1.) novel polyisocyanurate plastic and (2.) the ability to modify said plastic in a very wide variety of ways through use of previously modified starting polyisocyanates B) represents a significant advantage of the invention compared to the prior art.

The invention is elucidated in detail hereinafter with reference to examples.

EXAMPLES

All reported percentages are based on weight unless otherwise stated.

The NCO contents were determined by titrimetry in accordance with DIN EN ISO 11909.

The residual monomer contents were measured in accordance with DIN EN ISO 10283 by gas chromatography with an internal standard.

All the viscosity measurements were made with a Physica MCR 51 rheometer from Anton Paar Germany GmbH (Germany) to DIN EN ISO 3219.

The densities of the starting polyisocyanates were determined to DIN EN ISO 2811, and those of the cured polyisocyanurate plastics to DIN EN ISO 1183-1.

The contents (mol %) of the uretdione, isocyanurate, allophanate, biuret, iminooxadiazinedione and/or oxadiazinetrione structures present in the starting polyisocyanates were calculated from the integrals of proton-decoupled $^{13}$C NMR spectra (recorded on a Bruker DPX-400 instrument) and are each based on the sum total of uretdione, isocyanurate, allophanate, biuret, iminooxadiazinedione and/or oxadiazinetrione structures present. In the case of HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3; oxadiazinetrione: 147.8 and 143.9.

The glass transition temperature Tg was determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values stated in the table below are based in each case on the evaluation of the 3rd heating curve. The glass transition temperature Tg determined was the temperature at half the height of a glass transition step.

Shore hardnesses were measured to DIN 53505 with the aid of a Zwick 3100 Shore hardness tester (from Zwick, Germany).

IR spectra were recorded on a Spectrum Two FT-IR spectrometer equipped with an ATR unit, from Perkin Elmer, Inc.

Water absorption of the test specimens was determined by gravimetric means after seven-day storage in water at 23° C.

Contact angle, surface tension and surface energy were determined at 23° C. with an OCA 20 contact angle measuring instrument from Dataphysics GmbH.

Starting Compounds

Oligomeric Starting Polyisocyanate B1)-1

For use as polyisocyanate composition A), the starting polyisocyanate A1) prepared was an HDI polyisocyanate containing isocyanurate groups, prepared in accordance with Example 11 of EP-A 330 966. The reaction was stopped at an NCO content of the crude mixture of 40% by addition of dibutyl phosphate. Subsequently, unconverted HDI was removed by thin-film distillation at a temperature of 130° C. and a pressure of 0.2 mbar.

NCO content: 21.8%
NCO functionality: 3.4
Monomeric HDI: 0.1%
Viscosity (23° C.): 3000 mPas
Density (20° C.): 1.17 g/cm$^3$
Distribution of the oligomeric structure types:
Isocyanurate: 84.5 mol %
Iminooxadiazinedione 5.4 mol %
Uretdione 2.9 mol %
Allophanate: 7.2 mol %

Oligomeric, Modified Polyisocyanate B)-1

870 g (4.51 val) of the oligomeric starting polyisocyanate B1)-1 were admixed with 130 g (0.37 val) of a methanol-started, monofunctional polyethylene oxide polyether having an average molecular weight of 350 at room temperature with stirring and subsequently heated to 100° C. for 3 h. After cooling to room temperature an oligomeric, modified polyisocyanate was obtained. The product had the following characteristic data:
NCO content: 17.4%
NCO functionality: 3.2
Monomeric HDI: 0.1%
Viscosity (23° C.): 3050 mPas Oligomeric, Modified Polyisocyanate B)-2

900 g (4.67 val) of the oligomeric starting polyisocyanate B1)-1 were initially charged under dry nitrogen and with stirring at 100° C., over 30 min admixed with 100 g (0.20 val) of a methanol-started, monofunctional polyethylene oxide polyether having an average molecular weight of 500 and subsequently subjected to further stirring at this temperature until the NCO content of the mixture had fallen to a value of 18.8% corresponding to a complete urethanization after approximately 2 h. After addition of 0.01 g of zinc(II) 2-ethyl-1-hexanoate as allophanatization catalyst the temperature of the reaction mixture increased to 106° C. on account of the liberated heat of reaction. Once the exothermicity had died down, approximately 30 min after catalyst addition, the reaction was terminated by addition of 0.01 g of benzoyl chloride and the reaction mixture was cooled to room temperature. A practically colorless, clear polyisocyanate mixture according to the invention and having the following characteristic data was obtained:
NCO content: 18.0%
NCO functionality: 3.8
Monomeric HDI: 0.1%
Viscosity (23° C.): 4000 mPas Oligomeric, Modified Bolyisocyanate B)-3

850 g (4.41 val) of the oligomeric starting polyisocyanate B1)-1 were initially charged under dry nitrogen and with stirring at 100° C., over 30 min admixed with 150 g (0.30 val) of a methanol-started, monofunctional polyethylene oxide polyether having an average molecular weight of 500 and subsequently subjected to further stirring at this temperature until the NCO content of the mixture had fallen to a value of 17.3% corresponding to a complete urethanization after approximately 2 h. After addition of 0.01 g of zinc(II) 2-ethyl-1-hexanoate as allophanatization catalyst the temperature of the reaction mixture increased to 108° C. on account of the liberated heat of reaction. Once the exothermicity had died down, approximately 30 min after catalyst addition, the reaction was terminated by addition of 0.01 g of benzoyl chloride and the reaction mixture was cooled to room temperature. A practically colorless, clear polyisocyanate mixture according to the invention and having the following characteristic data was obtained:
NCO content: 16.0%
NCO functionality: 4.0
Monomeric HDI: 0.1%
Viscosity (23° C.): 6500 mPas Catalyst Mixture C)-1

To produce the catalyst 159.058 g of diethylene glycol were mixed with 24.588 g of 18-crown-6 and 7.557 g of potassium acetate and stirred at room temperature until a homogeneous solution was formed.

All raw materials were obtained from Sigma-Aldrich.

Production of the Inventive Examples 120 g of the starting polyisocyanate were weighed into a polypropylene cup together with 3.7 g of the catalyst mixture C)-1 and homogenized at 3500 rpm for 1 min using a DAC 150 FVZ Speed-Mixer (Hauschild, Germany). 12 g of the obtained mixture were poured into an aluminum dish having a diameter of 9.7 cm and subsequently cured at 180° C. for 15 minutes in an oven.

Transparent modified polyisocyanurate plastics having the following characteristic data were obtained:

|  | Starting polyisocyanate | | |
| --- | --- | --- | --- |
|  | B)-1 | B)-2 | B)-3 |
| Appearance | clear | clear | clear |
| Glass transition temperature | 55.5° C. | 68.0° C. | 52.5° C. |
| Shore D hardness | 75 | 76 | 74 |

In all experiments, IR spectroscopy no longer detected any isocyanate groups (band at 2270 cm$^{-1}$) in the reaction product.

Determination of Water Absorption

Test specimens from the inventive examples B)-1 to B)-3 and a test specimen of the starting polyisocyanate B1)-1 produced in the same way were each stored in a vessel with deionized water at 23° C. for 7 days. Once the duration of storage had elapsed the test specimens were removed from the vessel, patted dry with a paper towel and subsequently weighed. Water absorption was calculated via the difference in weight before and after storage in water.

|  | Starting polyisocyanate | | | |
| --- | --- | --- | --- | --- |
|  | B1)-1 | B)-1 | B)-2 | B)-3 |
| Water absorption [g] | 0.056 | 0.167 | 0.108 | 0.240 |

The surface energy and the contact angle with water as a test medium were measured on the underside of the test specimens.

|  | Starting polyisocyanate | | | |
| --- | --- | --- | --- | --- |
|  | B1)-1 | B)-1 | B)-2 | B)-3 |
| Contact angle [water] | 61.7 | 47.1 | 51.7 | 50.5 |
| Surface energy [mN/m] | 45.6 | 50.8 | 49.3 | 51.5 |
| Polar proportion [mN/m] | 13.2 | 20.5 | 18.4 | 17.4 |

Both the determination of water absorption and the measurement of surface energy and contact angle demonstrate the hydrophilic and strongly polar character of the inventive test specimens. Said specimens thus differ markedly from the unmodified starting polyisocyanate.

The invention claimed is:
1. A modified polyisocyanurate plastic obtained by a process comprising the steps of:
(a1) providing a composition A), containing oligomeric, modified polyisocyanates B) and not more than 20% by weight of monomeric diisocyanates based on the weight of the composition A), wherein the oligomeric modified polyisocyanates B) constitute a reaction product of an oligomeric polyisocyanate B1) and at least one isocyanate-reactive functionalization reagent B2), and wherein the at least one isocyanate-reactive functionalization reagent B2) comprises at least one isocyanate-reactive functional group which is not an isocyanate group, wherein the at least one isocyanate-reactive functionalization reagent B2) is chosen such that after reaction with the polyisocyanate B1) and catalytic trimerization of the composition A) it increases the surface energy of the polyisocyanurate plastic by at least 2 mN/m;

(a2) catalytic trimerization of the composition A), wherein the modified polyisocyanurate plastic is a solid, transparent and bubble-free molding.

2. The modified polyisocyanurate plastic as claimed in claim 1, wherein the at least one isocyanate-reactive functionalization reagent B2) has a surface tension of >20 mN/m and <70 mN/m.

3. The modified polyisocyanurate plastic as claimed in claim 1, wherein the at least one isocyanate-reactive functionalization reagent B2) is chosen such that after reaction with polyisocyanate B1) it increases the surface tension of B) by at least 2 mN/m.

4. The modified polyisocyanurate plastic as claimed in claim 1, wherein the at least one isocyanate-reactive functionalization reagent B2) is a polyether alcohol.

5. The modified polyisocyanurate plastic as claimed in claim 4, wherein the polyether alcohol is a polyalkylene oxide polyether alcohol having a statistical average of 5 to 50 ethylene oxide units per molecule.

6. The modified polyisocyanurate plastic as claimed in claim 5, wherein the polyalkylene oxide polyether alcohol consist of ethylene oxide units to an extent of at least 70 mol %.

7. The modified polyisocyanurate plastic as claimed in claim 5, wherein the polyalkylene oxide polyether alcohol is a polyethylene glycol monomethyl ether alcohol.

8. The modified polyisocyanurate plastic as claimed in claim 1, wherein the oligomeric polyisocyanate B1) is constructed on the basis of 1,5-diisocyanatopentane (PDI), 1,6-diisocyanatohexane (HDI), isophorone diisocyanate (IPDI), 1,3-bis(isocyanatomethyl)cyclohexane, 1,4-bis(isocyanatomethyl)cyclohexane, 2,4'-diisocyanatodicyclohexylmethane or 4,4'-diisocyanatodicyclohexylmethane (H12MDI) or mixtures thereof.

9. The modified polyisocyanurate plastic as claimed in claim 1, wherein the catalytic trimerization is carried out in the presence of a trimerization catalyst C), wherein the trimerization catalyst C) comprises at least one alkali metal or alkaline earth metal salt.

10. The modified polyisocyanurate plastic as claimed in claim 1, wherein it constitutes a highly converted modified polyisocyanurate plastic in which not more than 20% of the isocyanate groups originally contained in the composition A) have been preserved.

11. A process for producing a modified polyisocyanurate plastic solid, transparent and bubble-free body, comprising the steps of:

(a1) providing a composition A), containing oligomeric, modified polyisocyanates B) and not more than 20% by weight of monomeric diisocyanates based on the weight of the composition A), wherein the oligomeric modified polyisocyanates B) constitute a reaction product of an oligomeric polyisocyanate B1) and at least one isocyanate-reactive functionalization reagent B2), and wherein the at least one isocyanate-reactive functionalization reagent B2) comprises at least one isocyanate-reactive functional group which is not an isocyanate group, wherein the at least one isocyanate-reactive functionalization reagent B2) is chosen such that after reaction with the polyisocyanate B1) and catalytic trimerization of the composition A) it increases the surface energy of the polyisocyanurate plastic by at least 2 mN/m;

(a2) catalytic trimerization of the composition A), wherein the solid, transparent and bubble-free body is a molding.

12. The process as claimed in claim 11, wherein the catalytic trimerization is carried out in the presence of a trimerization catalyst C).

13. The process as claimed in claim 11, wherein the oligomeric polyisocyanate B1) is constructed on the basis of 1,5-diisocyanatopentane (PDI), 1,6-diisocyanatohexane (HDI), isophorone diisocyanate (IPDI), 1,3-bis(isocyanatomethyl)cyclohexane, 1,4-bis(isocyanatomethyl)cyclohexane, 2,4'-diisocyanatodicyclohexylmethane or 4,4'-diisocyanatodicyclohexylmethane (H12MDI) or mixtures thereof, and wherein the at least one isocyanate-reactive functionalization reagent B2) has a surface tension of >20 mN/m and <70 mN/m.

14. The process as claimed in claim 11, wherein the catalytic trimerization is continued at least up to a degree of conversion at which only not more than 20% of the isocyanate groups originally contained in the composition A) remain present, so that a highly converted modified polyisocyanurate plastic is obtained.

* * * * *